US012059791B1

(12) United States Patent
Chiang

(10) Patent No.: US 12,059,791 B1
(45) Date of Patent: Aug. 13, 2024

(54) PNEUMATIC TOOL

(71) Applicant: Hsu Huan Chiang, Taichung (TW)

(72) Inventor: Hsu Huan Chiang, Taichung (TW)

( * ) Notice: Subject to any disclaimer, the term of this patent is extended or adjusted under 35 U.S.C. 154(b) by 0 days.

(21) Appl. No.: 18/308,207

(22) Filed: Apr. 27, 2023

(51) Int. Cl.
*B25F 5/00* (2006.01)
*B25B 21/00* (2006.01)

(52) U.S. Cl.
CPC ............ *B25F 5/008* (2013.01); *B25B 21/004* (2013.01)

(58) Field of Classification Search
CPC .... B25F 5/02; B25F 5/001; B25F 3/00; B25F 5/006; B25F 5/005
USPC .................. 173/218, 168, 169, 104, 177, 93
See application file for complete search history.

(56) References Cited

U.S. PATENT DOCUMENTS

2009/0272554 A1* 11/2009 Young ..................... F01D 15/06 173/169
2011/0036606 A1* 2/2011 Young ..................... F01D 15/06 173/104
2011/0083869 A1* 4/2011 Lin ........................... B25F 5/02 173/218

* cited by examiner

*Primary Examiner* — Jacob A Smith
(74) *Attorney, Agent, or Firm* — MUNCY, GEISSLER, OLDS & LOWE, P.C.

(57) ABSTRACT

A pneumatic tool has an air outlet chamber, at least one forward channel, a rear transmission spacing, at least one washer channel, at least one shaft channel, at least one bushing channel, and a front transmission chamber sequentially communicating with one another. Compressed air for driving the pneumatic motor flows into the air outlet chamber, and then flows forwardly to the front transmission chamber through the at least one forward channel, the at least one washer channel, the rear transmission spacing, the at least one shaft channel, and the least one bushing channel, sequentially. Heat produced by the pneumatic tool is continuously carried by the compressed air flowing forwardly, thereby dissipating the heat and cooling the transmission set.

20 Claims, 11 Drawing Sheets

PNEUMATIC TOOL

BACKGROUND OF THE INVENTION

1. Field of the Invention

The present invention relates to a pneumatic tool, and more particularly to a pneumatic tool having advantages in heat dissipation.

2. Description of Related Art

A conventional pneumatic tool is driven by compressed air supplied by an air compressor. The conventional pneumatic tool, such as a pneumatic ratchet wrench, substantially comprises a pneumatic motor, a transmission shaft, and a wrench head disposed in a housing. The pneumatic motor is driven by the compressed air. The transmission shaft is driven by the pneumatic motor to rotate relative to the housing and drives the wrench head to fasten or to loosen a fastener.

However, it tends to produce heat when the transmission shaft is rapidly spinning relative to the housing and driving the wrench head. Therefore, the conventional pneumatic tool needs to be improved.

To overcome the shortcomings, the present invention tends to provide a pneumatic tool to mitigate the aforementioned problems.

SUMMARY OF THE INVENTION

The main objective of the invention is to provide a pneumatic tool that may provide a good cooling effect.

A pneumatic tool has an air outlet chamber, at least one forward channel, a rear transmission spacing, at least one washer channel, at least one shaft channel, at least one bushing channel, and a front transmission chamber sequentially communicating with one another. The at least one forward channel communicates with the air outlet chamber. The at least one washer channel is formed through a communicating washer between a pneumatic motor and a transmission set and communicates with said forward channel and a rear transmission spacing between a housing and a rear portion of a transmission set. The at least one shaft channel is between a transmission shaft and a first bearing of the transmission set and communicates with the at least one bushing channel formed through a bearing bush of the transmission set and communicates with the at least one shaft channel and the front transmission chamber.

Other objects, advantages and novel features of the invention will become more apparent from the following detailed description when taken in conjunction with the accompanying drawings.

DETAILED DESCRIPTION OF PREFERRED EMBODIMENTS

Figure 1:
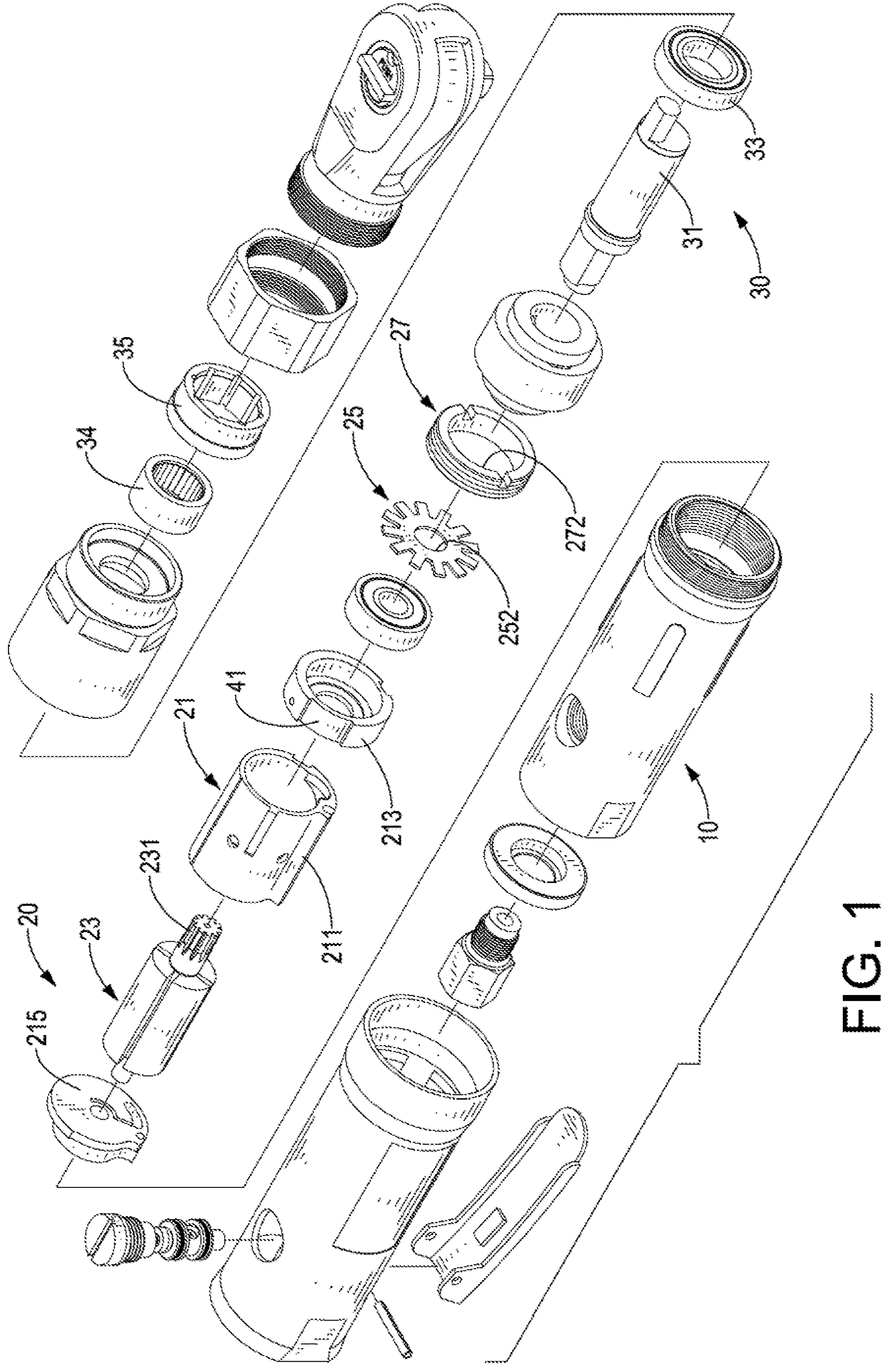
FIG. 1 is an exploded perspective view of a pneumatic tool in accordance with the present invention.
Figure 2:
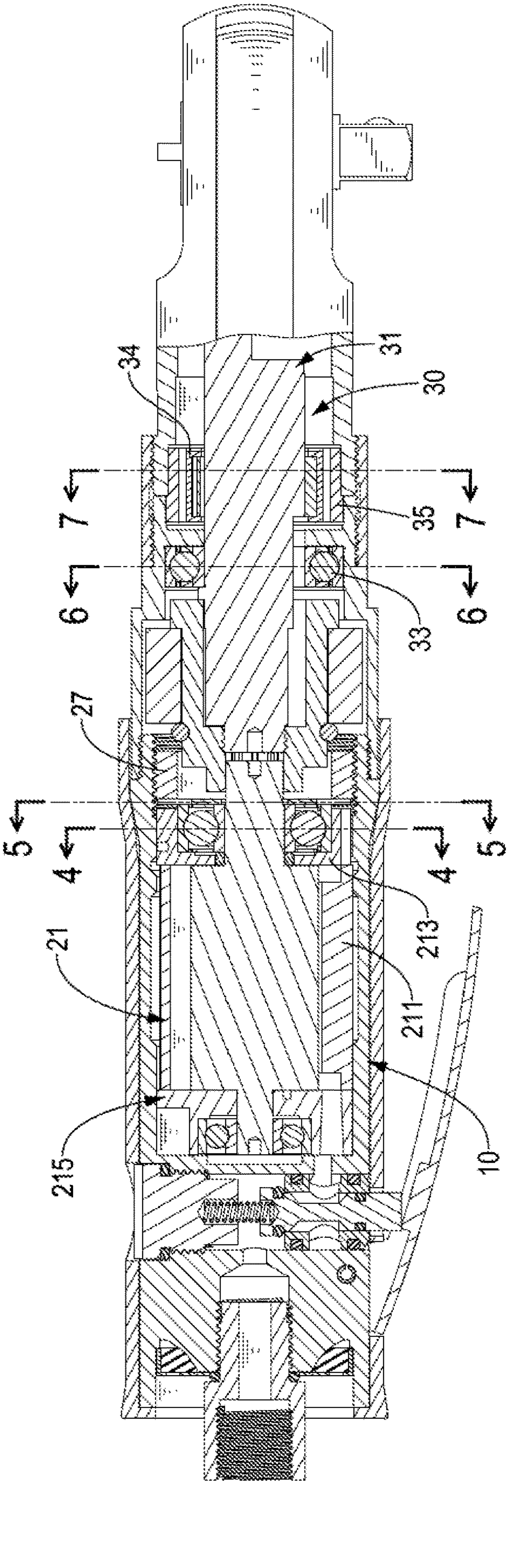
FIG. 2 is a cross sectional side view of the pneumatic tool in FIG. 1.
Figure 3:
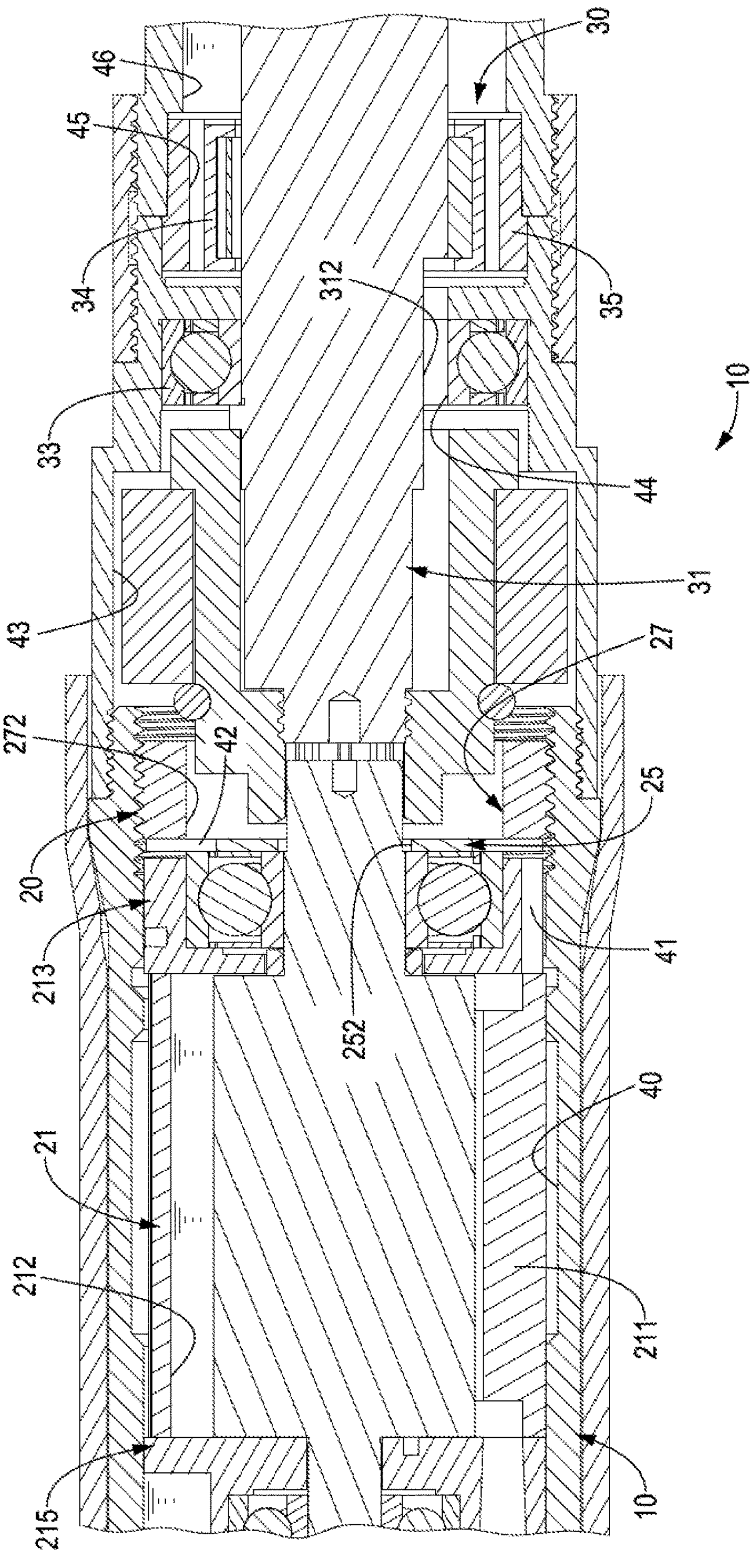
FIG. 3 is an enlarged cross sectional side view of the pneumatic tool in FIG. 2.
Figure 4:
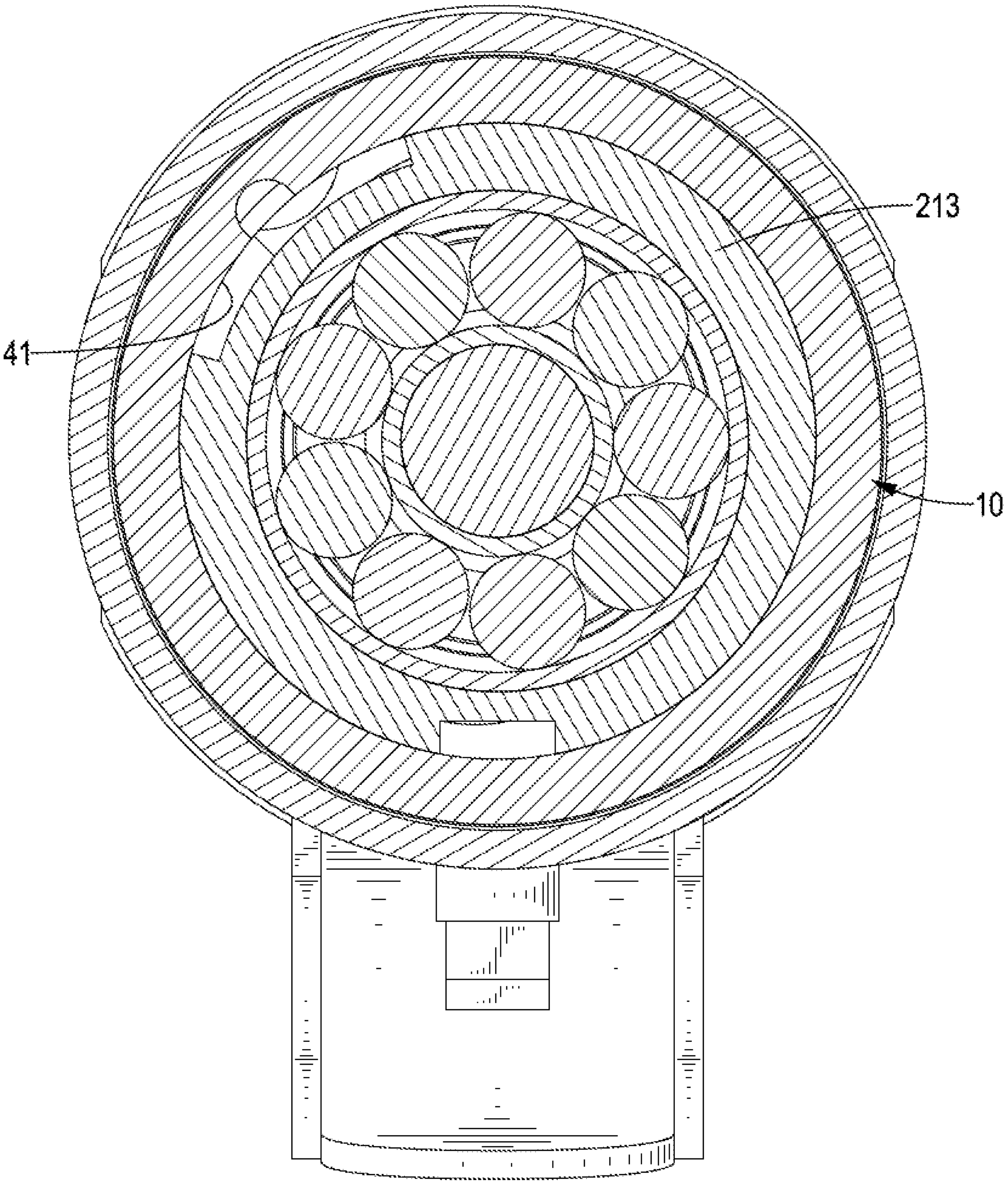
FIG. 4 is a cross sectional end view of the pneumatic tool along line 4-4 in FIG. 2.
Figure 5:
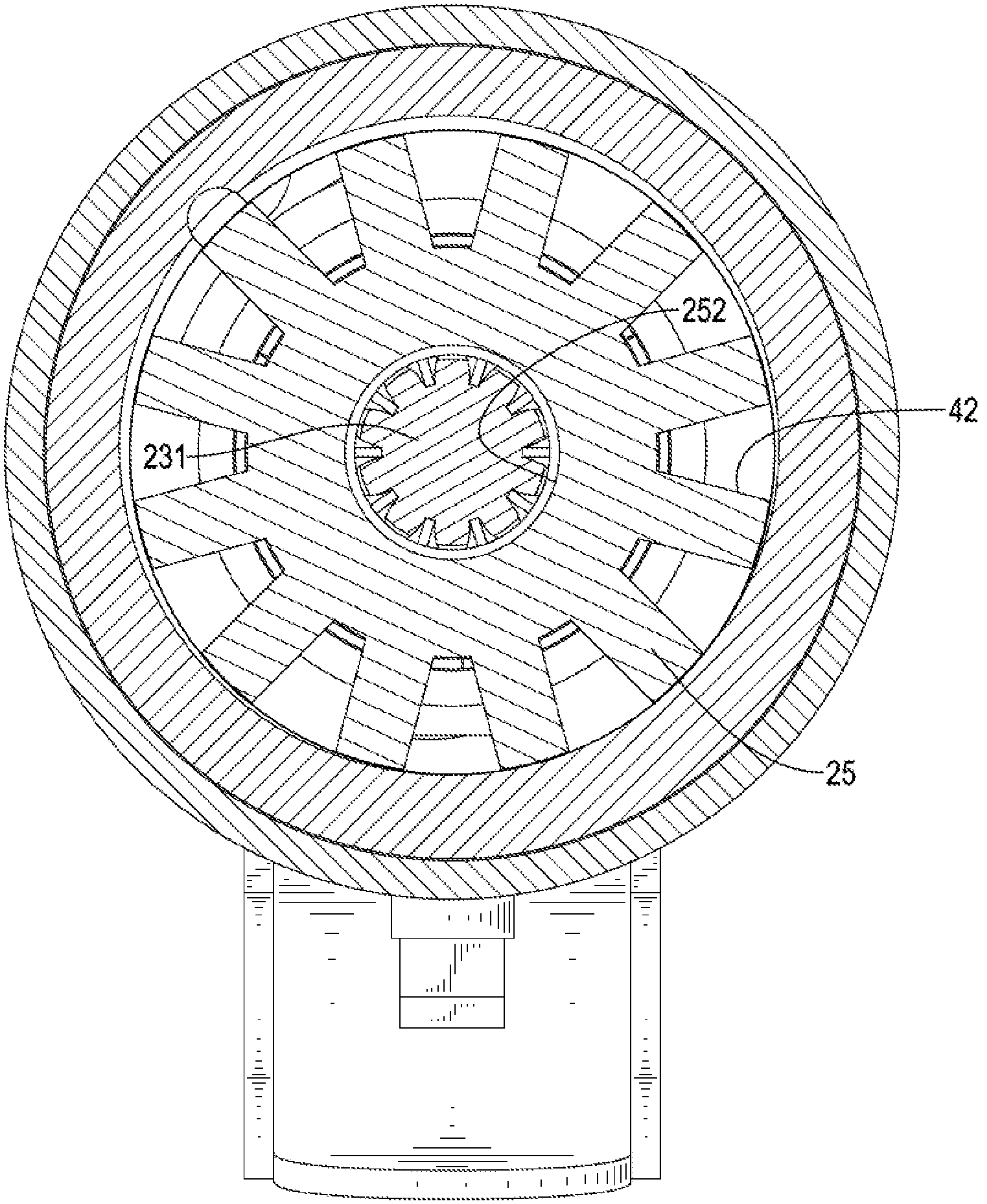
FIG. 5 is a cross sectional end view of the pneumatic tool along line 5-5 in FIG. 2.
Figure 6:
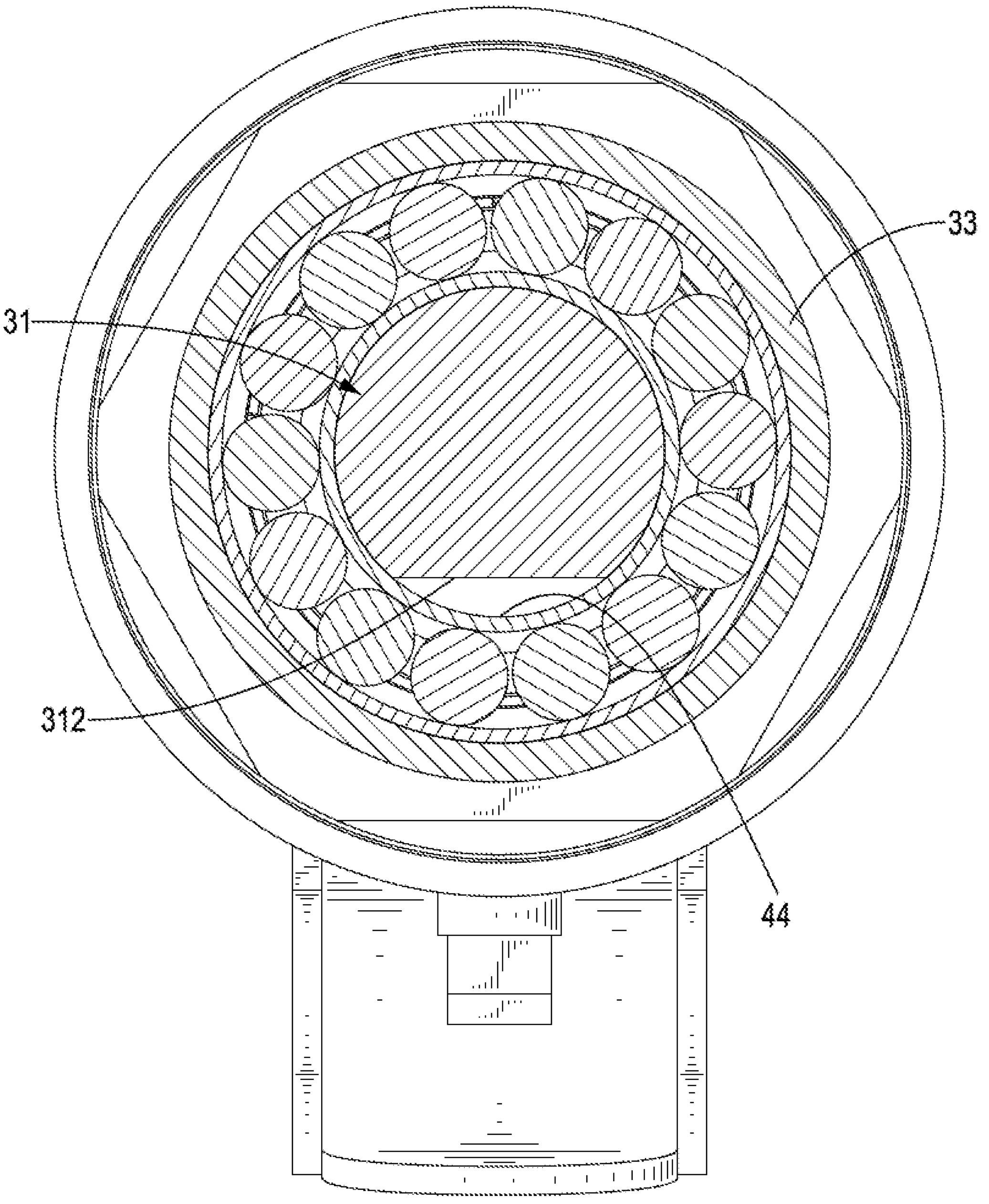
FIG. 6 is a cross sectional end view of the pneumatic tool along line 6-6 in FIG. 2.
Figure 7:
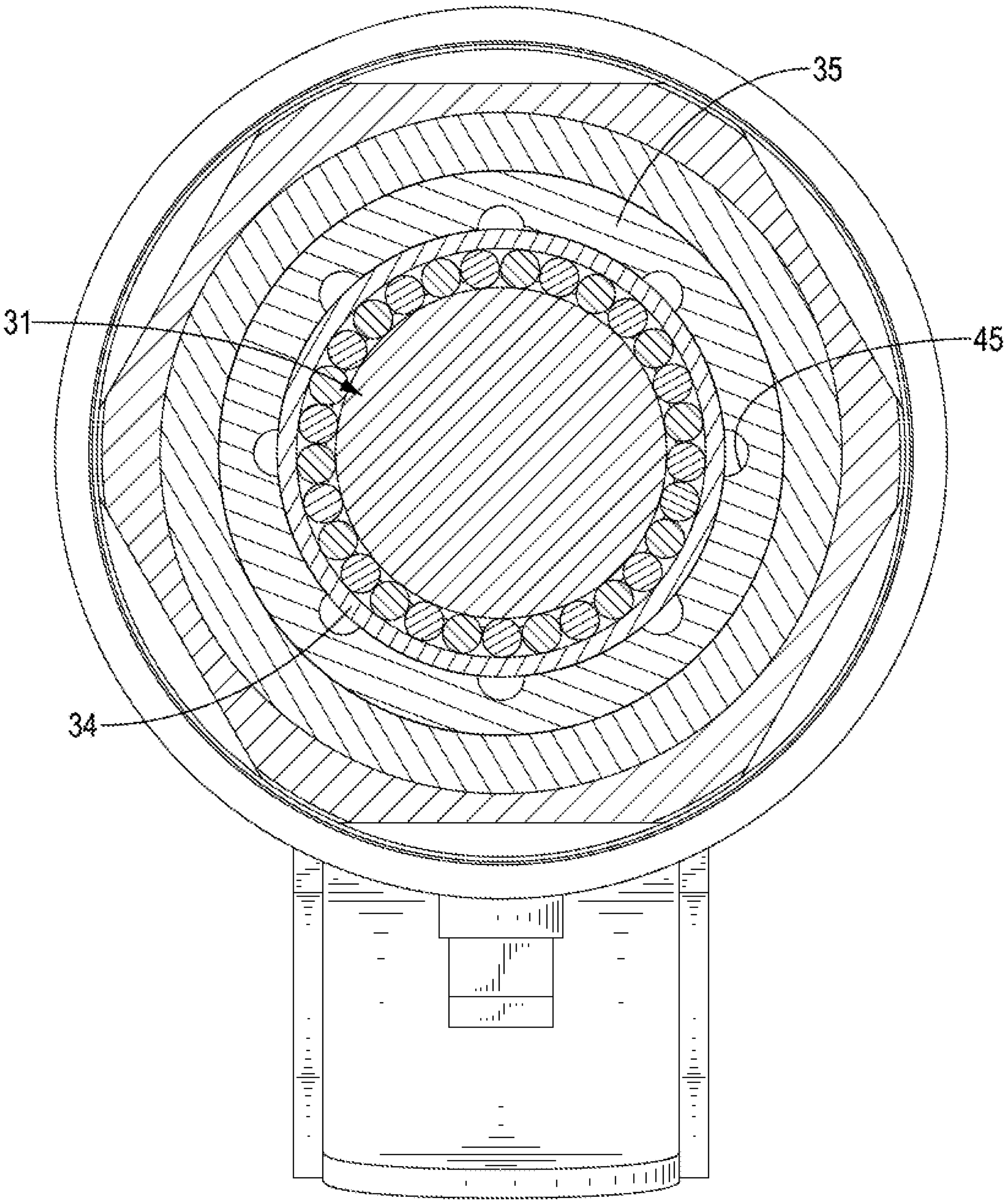
FIG. 7 is a cross sectional end view of the pneumatic tool along line 7-7 in FIG. 2.
Figure 8:
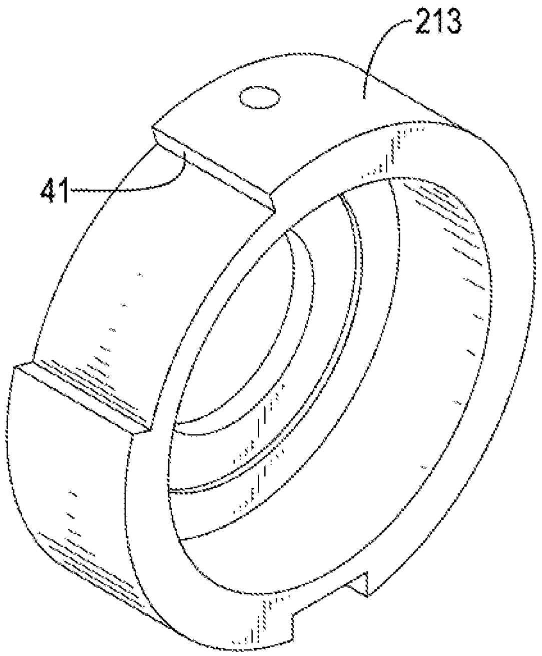
FIG. 8 is a perspective view of a front end plate of the pneumatic tool in FIG. 1.
Figure 9:
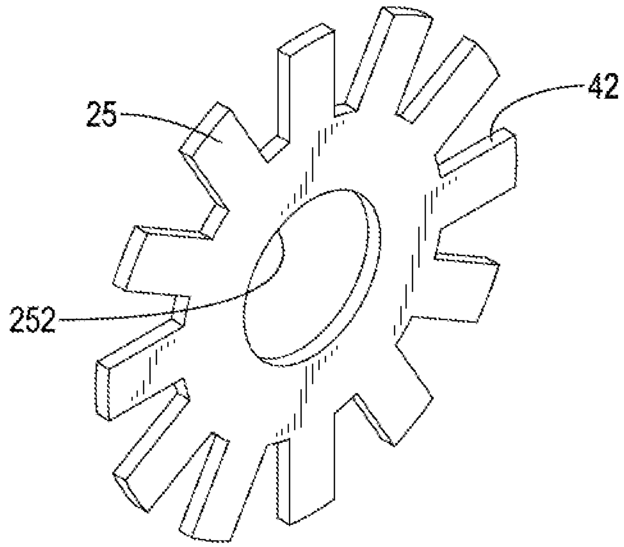
FIG. 9 is a perspective view of a communicating washer of the pneumatic tool in FIG. 1.
Figure 10:
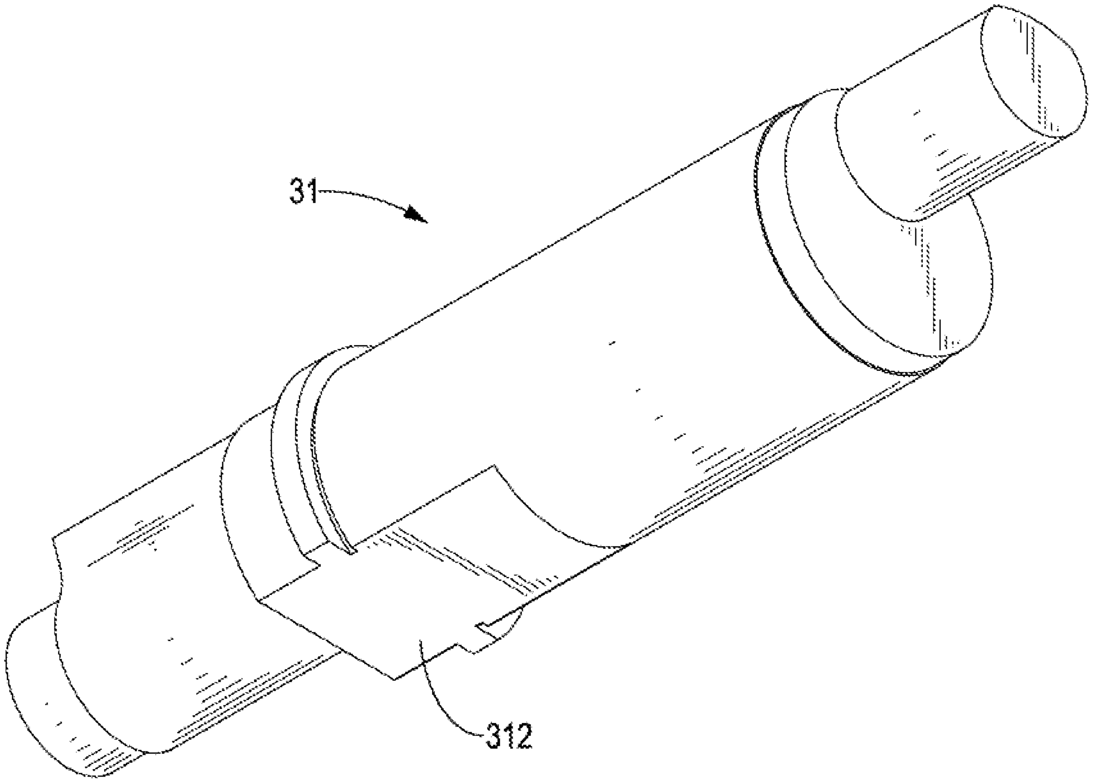
FIG. 10 is a perspective view of a transmission shaft of the pneumatic tool in FIG. 1.
Figure 11:
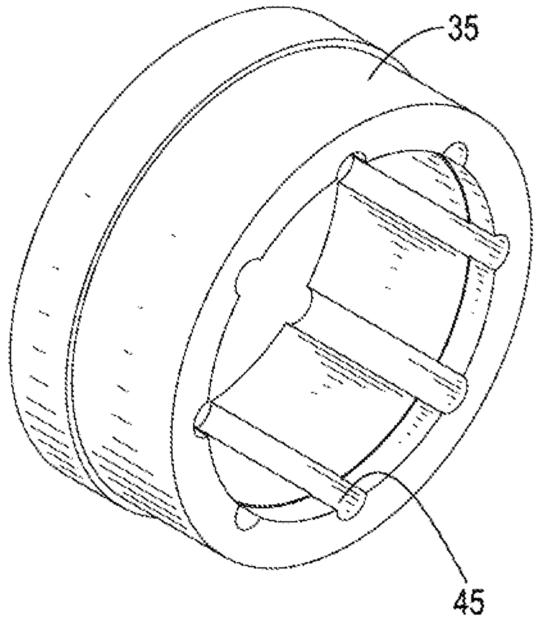
FIG. 11 is a perspective view of a bearing bush of the pneumatic tool in FIG. 1.

With reference to FIGS. 1 to 3, a pneumatic tool in accordance with the present invention comprises a housing 10, a pneumatic motor 20, a transmission set 30, an air outlet chamber 40, at least one forward channel 41, a rear transmission spacing 43, a communicating washer 25, at least one washer channel 42, at least one shaft channel 44, at least one bushing channel 45, and a front transmission chamber 46.

The housing 10 is hollow and has three sections connected with one another.

The pneumatic motor 20 is disposed in the housing 10 and includes a cylinder set 21 and a rotor set 23. The cylinder set 21 includes a front, a rear, and a cylinder chamber 212 formed in the cylinder set 21. Specifically, the cylinder set 21 includes a cylinder body 211, a front end plate 213 disposed at a front of the cylinder body 211, and a rear end plate 215 disposed at a rear of the cylinder body 211. The rotor set 23 is disposed in the cylinder chamber 212, is rotatable relative to the cylinder set 21, and has a rotor shaft 231 extending through the front of the cylinder set 21.

The transmission set 30 is disposed in front of the pneumatic motor 20 and is connected to the pneumatic motor 20. The transmission set 30 includes a transmission shaft 31, a first bearing 33, a second bearing 34, and a bearing bush 35. The transmission shaft 31 is connected to the rotor set 23 of the pneumatic motor 20 to be driven by the pneumatic motor 20. The first bearing 33 is a ball bearing, and is sleeved on and holds the transmission shaft 31. The second bearing 34 is a needle bearing, is sleeved on and holds the transmission shaft 31, and is disposed in front of the first bearing 33. The bearing bush 35 is sleeved on and surrounds the second bearing 34 and is located between the housing 10 and the second bearing 34. The bearing bush 35 may be made of metal and made by powder metallurgy.

With reference to FIGS. 1 to 3, the air outlet chamber 40 is formed between the housing 10 and cylinder set 21 of the pneumatic motor 20 and communicates with the cylinder chamber 212 via through holes radially defined through the cylinder set 21. Compressed air is input into the cylinder chamber 212 to push the rotor set 23 to rotate relative to the cylinder set 21, and then flows out from the cylinder chamber 212 to the air outlet chamber 40.

With reference to FIGS. 1 to 4, and 8, the at least one forward channel 41 is formed through the front of the cylinder set 21 and communicates with the air outlet chamber 40 to allow the compressed air in the air outlet chamber 40 to flow through the front of the cylinder set 21. Specifically, the at least one forward channel 41 is recessed at an exterior surface of and axially formed through the front end plate 213 and is formed between the housing 10 and the front end plate 213.

With reference to FIGS. 1 to 3, the rear transmission spacing 43 is formed between the housing 10 and a rear portion of the transmission set 30 adjacent to the pneumatic motor 20. The front transmission chamber 46 is formed between the housing 10 and a front portion of the transmission set 30.

With reference to FIGS. 1 to 3, 5, and 9, the communicating washer 25 is disposed between the cylinder set 21 and the transmission set 30, is located in front of the cylinder set 21, and has a washer hole 252 formed through the communicating washer 25. The rotor shaft 231 extends through the washer hole 252. The at least one washer channel 42 is formed through the communicating washer 25 and axially communicates with the at least one forward channel 41 and the rear transmission spacing 43. Therefore, the compressed air flowing out from the front of the cylinder set 21 flows into the rear transmission spacing 43 via the at least one washer channel 42. Preferably, multiple said washer channels 42 are formed through the communicating washer 25, are arranged around the washer hole 252 of the communicating washer 25 at angular intervals, and radially extend toward the washer hole 252 of the communicating washer 25. A clamp nut 27 is screwed to the housing 10, is disposed in front of the cylinder set to fix the cylinder set 21 in position, and has a nut hole 272 axially formed through the clamp nut 27. The communicating washer 25 is disposed between the cylinder set 21 and the clamp nut 27. The rear portion of the transmission set 30 partially extends into the nut hole 272 of the clamp nut 27 and is spaced apart from a surface of the nut hole 272 of the clamp nut 27. A gap is formed between the surface of the nut hole 272 of the clamp nut 27 and the rear portion of the transmission set 30 and communicates with the rear transmission spacing 43 and said washer channel 42.

With reference to FIGS. 1 to 3, 6, and 10, the at least one shaft channel 44 is formed between the transmission shaft 31 and the first bearing 33 and communicates with the rear transmission spacing 43. The transmission shaft 31 may have at least one indentation 312 recessed at a peripheral surface of the transmission shaft 31 and extending through the first bearing 33 to form the at least one shaft channel 44 between the transmission shaft 31 and the first bearing 33. Each of the at least one indentation 312 may include a flat surface.

With reference to FIGS. 1, 3, 7, and 11, the at least one bushing channel 45 is axially formed through the bearing bush 35 and communicates with the at least one shaft channel 44 and the front transmission chamber 46. Therefore, the compressed air can flow from the rear transmission spacing 43 to the front transmission chamber 46 via the at least one shaft channel 44 and the at least one bushing channel 45. Specifically, multiple said bushing channels 45 are formed through the bearing bush 35 and arranged around the bearing bush 35 at angular intervals. The bushing channels 45 may be formed between the bearing bush 35 and the second bearing 34 or between the bearing bush 35 and the housing 10.

With such arrangement, the compressed air for driving the pneumatic motor 20 flows into the air outlet chamber 40, and then flows forwardly to the front transmission chamber 46 through the at least one forward channel 41, the at least one washer channel 42, the rear transmission spacing 43, the at least one shaft channel 44, and the least one bushing channel 45, sequentially. Accordingly, while the transmission set 30 is rapidly spinning, the heat produced by the pneumatic tool of the present invention is continuously carried by the compressed air flowing forwardly, thereby dissipating the heat and cooling the transmission set 30. The pneumatic tool in accordance with the present invention can provide a good cooling effect.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pneumatic tool comprising:
- a housing;
- a pneumatic motor disposed in the housing and including
  - a cylinder set including
    - a front;
    - a rear; and
    - a cylinder chamber formed in the cylinder set; and
  - a rotor set disposed in the cylinder chamber of the cylinder set;
- a transmission set disposed in front of the pneumatic motor, connected to the pneumatic motor, and including
  - a rear portion;
  - a front portion;
  - a transmission shaft connected to the rotor set;
  - a first bearing sleeved on and holding the transmission shaft;
  - a second bearing sleeved on and holding the transmission shaft, and disposed in front of the first bearing; and
  - a bearing bush sleeved on and surrounding the second bearing;
- an air outlet chamber formed between the housing and the cylinder set and communicating with the cylinder chamber;
- at least one forward channel formed through the front of the cylinder set and communicating with the air outlet chamber;
- a rear transmission spacing formed between the housing and the rear portion of the transmission set;
- a front transmission chamber formed between the housing and the front portion of the transmission set;
- a communicating washer disposed between the cylinder set and the transmission set;
- at least one washer channel formed through the communicating washer and axially communicating with the at least one forward channel and the rear transmission spacing;
- at least one shaft channel formed between the transmission shaft and the first bearing and communicating with the rear transmission spacing; and
- at least one bushing channel axially formed through the bearing bush and communicating with the at least one shaft channel and the front transmission chamber.

2. The pneumatic tool as claimed in claim 1, wherein
- a clamp nut is screwed to the housing, is disposed in front of the cylinder set, and has a nut hole;
- the communicating washer is disposed between the cylinder set and the clamp nut;
- the rear portion of the transmission set partially extends into the nut hole of the clamp nut and is spaced apart from a surface of the nut hole of the clamp nut; and
- a gap is formed between the surface of the nut hole of the clamp nut and the rear portion of the transmission set and communicates with the rear transmission spacing and the at least one washer channel.

3. The pneumatic tool as claimed in claim 2, wherein
the communicating washer has a washer hole formed through the communicating washer; and
the at least one washer channel includes multiple washer channels arranged around the washer hole of the communicating washer at angular intervals, and radially extending toward the washer hole of the communicating washer.

4. The pneumatic tool as claimed in claim 3, wherein the at least one bushing channel includes multiple bushing channels arranged around the bearing bush at angular intervals.

5. The pneumatic tool as claimed in claim 4, wherein the transmission shaft has at least one indentation recessed at a peripheral surface of the transmission shaft and extending through the first bearing to form the at least one shaft channel between the transmission shaft and the first bearing.

6. The pneumatic tool as claimed in claim 3, wherein the transmission shaft has at least one indentation recessed at a peripheral surface of the transmission shaft and extending through the first bearing to form the at least one shaft channel between the transmission shaft and the first bearing.

7. The pneumatic tool as claimed in claim 3, wherein
the cylinder set includes a cylinder body and a front end plate disposed at a front of the cylinder body; and
the at least one forward channel is recessed at an exterior surface of the front end plate of the cylinder set.

8. The pneumatic tool as claimed in claim 2, wherein the at least one bushing channel includes multiple bushing channels arranged around the bearing bush at angular intervals.

9. The pneumatic tool as claimed in claim 8, wherein the transmission shaft has at least one indentation recessed at a peripheral surface of the transmission shaft and extending through the first bearing to form the at least one shaft channel between the transmission shaft and the first bearing.

10. The pneumatic tool as claimed in claim 2, wherein the transmission shaft has at least one indentation recessed at a peripheral surface of the transmission shaft and extending through the first bearing to form the at least one shaft channel between the transmission shaft and the first bearing.

11. The pneumatic tool as claimed in claim 2, wherein
the cylinder set includes a cylinder body and a front end plate disposed at a front of the cylinder body; and
the at least one forward channel is recessed at an exterior surface of the front end plate of the cylinder set.

12. The pneumatic tool as claimed in claim 1, wherein
the communicating washer has a washer hole formed through the communicating washer; and
the at least one washer channel includes multiple washer channels arranged around the washer hole of the communicating washer at angular intervals, and radially extending toward the washer hole of the communicating washer.

13. The pneumatic tool as claimed in claim 12, wherein the at least one bushing channel includes multiple bushing channels arranged around the bearing bush at angular intervals.

14. The pneumatic tool as claimed in claim 13, wherein the transmission shaft has at least one indentation recessed at a peripheral surface of the transmission shaft and extending through the first bearing to form the at least one shaft channel between the transmission shaft and the first bearing.

15. The pneumatic tool as claimed in claim 12, wherein the transmission shaft has at least one indentation recessed at a peripheral surface of the transmission shaft and extending through the first bearing to form the at least one shaft channel between the transmission shaft and the first bearing.

16. The pneumatic tool as claimed in claim 12, wherein
the cylinder set includes a cylinder body and a front end plate disposed at a front of the cylinder body; and
the at least one forward channel is recessed at an exterior surface of the front end plate of the cylinder set.

17. The pneumatic tool as claimed in claim 1, wherein the at least one bushing channel includes multiple bushing channels arranged around the bearing bush at angular intervals.

18. The pneumatic tool as claimed in claim 17, wherein the transmission shaft has at least one indentation recessed at a peripheral surface of the transmission shaft and extending through the first bearing to form the at least one shaft channel between the transmission shaft and the first bearing.

19. The pneumatic tool as claimed in claim 1, wherein the transmission shaft has at least one indentation recessed at a peripheral surface of the transmission shaft and extending through the first bearing to form the at least one shaft channel between the transmission shaft and the first bearing.

20. The pneumatic tool as claimed in claim 1, wherein
the cylinder set includes a cylinder body and a front end plate disposed at a front of the cylinder body; and
the at least one forward channel is recessed at an exterior surface of the front end plate of the cylinder set.

* * * * *